United States Patent
Cleaver et al.

(10) Patent No.: US 11,562,410 B2
(45) Date of Patent: Jan. 24, 2023

(54) PRE-PACKAGING AND PRE-CONFIGURATION OF SOFTWARE PRODUCTS USING CHATBOTS

(71) Applicant: Kyndryl, Inc., New York, NY (US)

(72) Inventors: James David Cleaver, Grose Wold (AU); Michael James McGuire, Sydney (AU); Seema Nagar, Bangalore (IN); Pramod Vadayadiyil Raveendran, Bengaluru (IN); Thuy Luong, Kellyville (AU); Kuntal Dey, Rampurhat (IN)

(73) Assignee: Kyndryl, Inc., New York, NY (US)

( * ) Notice: Subject to any disclaimer, the term of this patent is extended or adjusted under 35 U.S.C. 154(b) by 298 days.

(21) Appl. No.: 17/124,848

(22) Filed: Dec. 17, 2020

(65) Prior Publication Data

US 2022/0198531 A1 Jun. 23, 2022

(51) Int. Cl.
*G06F 9/44* (2018.01)
*G06Q 30/02* (2012.01)
(Continued)

(52) U.S. Cl.
CPC .......... *G06Q 30/0282* (2013.01); *G06F 8/10* (2013.01); *G06F 8/41* (2013.01); *G06Q 30/0621* (2013.01); *H04L 51/02* (2013.01)

(58) Field of Classification Search
CPC ............. G06F 8/10; G06F 8/41; H04L 51/02; G06Q 30/0282; G06Q 30/0621
(Continued)

(56) References Cited

U.S. PATENT DOCUMENTS 8,291,380 B2   10/2012  Bandyopadhyay
8,707,660 B2 * 4/2014   Howes ..................... B65B 9/20
                                                  53/550
(Continued)

OTHER PUBLICATIONS

Smiley et al., "A Dynamic Software Product Line Architecture for Prepackaged Expert Analytics", 2014, IEEE, pp. 205-214. (Year: 2014).*

(Continued)

*Primary Examiner* — Ted T. Vo
(74) *Attorney, Agent, or Firm* — Erik Swanson, Esq.; Kevin P. Radigan, Esq.; Heslin Rothenberg Farley & Mesiti P.C.

(57) ABSTRACT

Methods, systems, and computer program products for pre-packaging and pre-configuring software products using chatbot message exchanges with users are described. Embodiments may include receiving a user inquiry, initiating a first chat session comprising a primary chatbot within a user interface, receiving user request data corresponding to a first string of communications, and determining a product based on the user request data. Responsive to determining the product, embodiments may include initiating a second chat session comprising a secondary chatbot configured to elicit product feature information about the product within the user interface; receiving product data corresponding to a second string of communications comprising the product feature information; determining product package parameters based on product information; determining executables to provide the product based on user request data, product feature information, and product package parameters; and compiling the executables in respective groups based user requirements and user characteristics.

20 Claims, 5 Drawing Sheets

(51) Int. Cl.
*G06Q 30/06* (2012.01)
*H04L 51/02* (2022.01)
*G06F 8/41* (2018.01)
*G06F 8/10* (2018.01)

(58) Field of Classification Search
USPC .......................................................... 717/121
See application file for complete search history.

(56) References Cited

U.S. PATENT DOCUMENTS

| | | | | |
|---|---|---|---|---|
| 8,719,339 | B2* | 5/2014 | Reisman | G06Q 20/20 |
| | | | | 705/344 |
| 9,348,479 | B2* | 5/2016 | Liu | G06F 9/451 |
| 10,187,337 | B2 | 1/2019 | Smullen | |
| 10,757,044 | B2* | 8/2020 | Fawcett | G06F 16/3329 |
| 10,824,658 | B2* | 11/2020 | Bakis | G06N 20/00 |
| 10,922,957 | B2* | 2/2021 | Rhoads | G06K 9/6253 |
| 2016/0104206 | A1* | 4/2016 | Greenberg | G06Q 30/0277 |
| | | | | 705/14.73 |
| 2017/0293681 | A1 | 10/2017 | Blandin | |
| 2019/0140986 | A1 | 5/2019 | Anderson | |
| 2020/0160377 | A1 | 5/2020 | Bodin | |

OTHER PUBLICATIONS

Chavoshi et al., "On-Demand Bot Detection and Archival System", 2017, ACM, 5 pages. (Year: 2017).*

Wakil et al., "Intelligent Web Applications as Future Generation of Web Applications", 2019, Scientific Journal of Informatics, vol. 6, No. 2, pp. 213-221. (Year: 2019).*

Smajic, Samir, "The Ultimate Guide: How To Use Chatbots For Sales [2019]", GetAccept Inc., Palo Alto, California, Jan. 15, 2019, 3 Pages.

* cited by examiner

PRE-PACKAGING AND PRE-CONFIGURATION OF SOFTWARE PRODUCTS USING CHATBOTS

BACKGROUND

The present invention relates generally to the field of recommending software or services, and more particularly to pre-packaging and pre-configuring software products using chatbot conversations with users.

Chatbots are becoming an increasingly popular online method for product and service providers to interact with their customers and users. Chatbots are a form of software agent and may be referred to as chatterbots, Artificial Conversational Entities, conversational agents, smart assistants, chat robots, or other such terms. A chatbot is a system that mimics conversation, either by voice or text, with a user so as to provide the user with information and services and also solicit and receive information from the user. The objective is for a chatbot to accurately understand a user query and to respond accordingly. For example, a chatbot may receive a user query, determine the intent and purpose of the user query and return a relevant response, or perform a task or action.

A chatbot is typically designed for a limited number of use cases, in many cases a single use case. For example, users may ask a weather chatbot for a weather forecast, book tickets for travel or entertainment by accessing the chatbot for the relevant supplier, purchase products from retailers, and record information such as receipts with an accounting system chatbot. Chatbots allow users to interact with product and service providers in a simple and intuitive manner.

During a chatbot session with a client, lots of time is wasted to gather requirements used to select appropriate software components, dependencies, packaging, and configurations due to a communication gap between client and seller and because downstream team members get involved in the sales process at different times. This results in project execution delays and ultimately revenue loss.

SUMMARY

The present disclosure addresses the above-identified shortcomings. Embodiments of the present invention disclose a computer-implemented method, a computer program product, and a system for pre-packaging and pre-configuring software products and services using chatbot message exchanges with users. The computer-implemented method for pre-packaging and pre-configuring software products may include one or more processors configured for receiving a user inquiry and in response to receiving the user inquiry, initiating a first chat session comprising a primary chatbot within a user interface. The computer-implemented method may also be configured for receiving user request data corresponding to a first string of communications entered in the user interface. The computer-implemented method may also be configured for determining a product or service based on the user request data. Responsive to determining the product, the computer-implemented method may also be configured for initiating a second chat session comprising a secondary chatbot within the user interface, wherein the secondary chatbot is configured to elicit product feature information about the product. The computer-implemented method may be configured for receiving product data corresponding to a second string of communications comprising the product feature information entered in the user interface. The computer-implemented method may also be configured for determining product package parameters based on the product information. The computer-implemented method may also be configured for determining one or more executables configured to provide the product based at least on the user request data, the product feature information and the product package parameters. The computer-implemented method may also be configured for compiling the one or more executables in respective one or more groups based on one or more user requirements and user characteristics.

In an embodiment, initiating the chat session may include generating a messaging dialog user interface configured to receive a user input and provide a system-generated response to the user input. The second chat session may appear virtually as the same chat session as the first chat session, wherein the user will not be aware that a second chat session is now operating within the user interface.

In an embodiment, the computer-implemented method may also be configured for recommending components specific to a first category of users based on respective user histories and respective user feedback.

In an embodiment, compiling the one or more executables may further include determining flags and parameters based on the product data and including the flags and parameters in the one or more executables.

In an embodiment, the computer-implemented method may also be configured for generating a report corresponding to the one or more executables comprising one or more offers describing features and values corresponding to the user request data and the product data.

In an embodiment, the computer-implemented method may also be configured for analyzing the one or more groups of users based on the one or more user requirements and user characteristics. Further, the computer implemented method may be configured for identifying a first group of users having a common user requirement or user characteristic and compiling the one or more executables for the first group of users based on the common user requirements or user characteristic.

DETAILED DESCRIPTION

Embodiments of the present invention describe computer-implemented methods, systems, and computer program products for enabling automatic pre-packaging and pre-configuration of software products or service packages by utilizing a set of primary chatbots and secondary chatbots. As described herein, primary chatbots are high-level chatbots configured to initially interface with users interacting within a user interface and secondary chatbots are deep level chatbots that specialize in specific software products or services, wherein the high-level chatbots may also be configured for integrating products and/or services for the overall solution. Both primary and secondary chatbots are configured to gather client or user provided requirements and requirements derived from further questioning by the secondary chatbots over the same or disjoint chat sessions within the user interface. Embodiments of the present invention may be configured to inject compiler flags determined based on chat extracts and summarize different disjoint client discussions run by the same chatbot with different or same client representatives. An embodiment may also be configured to group the various chat discussions run by the same chatbot with different or same client representatives. Further, embodiments may be configured to group the many clients' requirements into buckets, compile once per bucket, and share with all clients in that bucket. Each bucket may be specific to characteristics including industry, regulations, compliance, country specific requirements, or a combination of each characteristic.

A business client is often unaware of how to best articulate what they require from a software product or service solution. The business client may also be often unaware of the current landscape and technical environment in which they operate their business. Such uncertainty and lack of familiarity leads to lengthy solutioning, purchasing non-essential components for software, and lengthy engagements to analyze and determine what parameters and features are required for their particular targeted solution.

For example, there may be a regulatory requirement for encryption when outside of a customer-controlled environment that the business client is not aware of. Further, the business client may not be aware of the potential compute overhead and software costs associated with implementing this particular encryption capability solution. When erroneous decisions are made in this environment, the business client may become exposed to regulatory consequences, fines, and sanctions in addition to potentially unnecessary license costs and performance impacts to the system.

Embodiments of the present invention disclose a computer-implemented method, a computer program product, and a system for pre-packaging and pre-configuring software products and services using chatbot message exchanges with users. In an embodiment, the computer-implemented method may include one or more processors configured for enabling software or service pre-packaging and pre-configuration by a primary chatbot and a secondary chatbot. The primary chatbot is a high-level component in the chat messaging system with a knowledgebase consistent with general product information sufficient to align requested client software features to software products or services based on the software product or service capabilities. The primary chatbot may be configured to pose questions to a client (e.g., user) to elicit more information about the client's needs to identify the appropriate software product or service to satisfy the client's needs. The primary chatbot may also be configured to engage or initiate multiple secondary chatbots depending on the query received in the messaging dialog executing and shown within the user interface.

The secondary chatbot is a deep level chatbot component in the chat messaging system with a knowledgebase consistent with a particular software product or service identified by the primary chatbot. The secondary chatbot may be configured to pose specific questions to a client to elicit information from the client to determine specific parameters and other features of the software product or service to satisfy the client's needs. Each secondary chatbot is provisioned with all the details associated with their particular software product or service. The secondary chatbot is invoked by the primary chatbot once the primary chatbot has identified the particular software product or service that the secondary chatbot specializes in. Multiple secondary chatbots may be configured to work in tandem under the control of the primary chatbot to process complex requirements.

In a system for pre-packaging and pre-configuring software products, the system may include a pre-configurator module configured to create configuration files at least by extracting keywords from client messages entered in the user interface and aligning the extracted keywords with product features, descriptions, documents, offering codes, etc. Further, the pre-configurator module may be configured to pose questions in the messaging dialog in the user interface to elicit responses from a client engaged in the messaging dialog to determine parameter values used to configure the determined software product, especially if those parameter values are not already determined to be entered in the messaging dialog provided in the user interface. Further, the pre-configurator module may be configured to determine compiler flags based on keywords entered in the messaging dialog and further to inject the compiler flags into one or more executables to be included as part of the software product.

In the system for pre-packaging and pre-configuring software products, the system may include a pre-package module configured to pre-package software packages and build and/or compile executables with certain flags and parameters determined based on keywords entered in and extracted from the messaging dialog. The pre-package module may also generate reports for use by downstream sales personnel to prepare the sales personnel with relevant information to include in an offer or proposal including certain values and features applicable to the client's stated needs.

The reports may be prepared in a specific format that can be provided to a service deployment or service orchestrator for downstream orchestration in a hybrid Multicloud environment. For example, in a hybrid Multicloud environment, service orchestration may determine parameters specific to a service offering, its dependencies, duration of service required, cost effectiveness, service availability with quality of service ("QOS") parameters, etc. The service orchestration parameters may be intelligently gathered using chatbots by eliciting user responses in a message dialog executing in a user interface, wherein the responses may be used to determine the parameters.

The pre-package module may be configured to group different client requirements into buckets, compile the respective executables once per bucket and share with all clients in that bucket. The buckets may be specific to industries, countries, or compliance requirements, etc. For example, for a plurality of clients, a first set of clients may have a first need type, a second set of clients may have a second need type, and a third set of clients may have a third need type. If the executables are to be compiled on the once per bucket basis, then there are three buckets including the same need types for the clients belonging to that bucket to be compiled. An additional bucket for generic clients with a default need type may be compiled, resulting in four total compilations using the once per bucket basis. Clients may be ranked according to their value to the business, wherein higher-ranking clients may be prioritized over lower ranking clients. Further, generic clients may have default values assigned to the parameters used to determine a ranking, wherein the default values may be replaced with custom values as per their needs within their business.

In the system for pre-packaging and pre-configuring software products, the system may include a requirement analytics module configured to analyze client requirements and place them into different sets of requirements or buckets for later processing or compiling. The requirement analytics module may also be configured to compile the client requirements on a once per bucket basis using data generated from the pre-package module and respective compilers. The sets of requirements or buckets may be organized by industry, country, or compliance requirements.

In the system for pre-packaging and pre-configuring software products, the system may include a recommendation module configured to recommend software components specific to specific industries, or countries, etc. The recommendation module may also be configured to recommend software components based on specific software categories and based on a purchase history associated with a particular client at least by matching software categories with the client specific feedback about their experience with a corresponding software tool.

The computer-implemented method for pre-packaging and pre-configuring software products may include one or more processors configured for receiving a user inquiry, and responsive to receiving the user inquiry, initiating a first chat session comprising a primary chatbot within a user interface.

The computer-implemented method may also be configured for receiving user request data corresponding to a first string of communications entered in the user interface.

The computer-implemented method may also be configured for determining a product based on the user request data. Responsive to determining the product, the computer-implemented method may also be configured for initiating a second chat session comprising a secondary chatbot within the user interface, wherein the secondary chatbot is configured to elicit product feature information about the product.

The computer-implemented method may also be configured for receiving product data corresponding to a second string of communications comprising the product feature information entered in the user interface; determining product package parameters based on the product information; determining one or more executables configured to provide the product based at least on the user request data, the product feature information, and the product package parameters; and compiling the one or more executables in respective one or more groups based on one or more of user requirements and user characteristics.

In an embodiment, initiating the chat session may include generating a messaging dialog user interface configured to receive a user input and provide a system-generated response to the user input. The second chat session may appear virtually as the same chat session as the first chat session, wherein the user will not be aware that a second chat session is now operating within the user interface, and recommending components specific to a first category of users based on respective user histories and respective user feedback.

In an embodiment, compiling the one or more executables may further include determining flags and parameters based on the product data and including the flags and parameters in the one or more executables. Each software product or service may be designed with its own set of configuration parameters corresponding to features and characteristics of the software product or service. For example, if it is determined that a user requested software product or service will require multiple licenses for multiple individual users of the software product or service, then the software product or service will be designed to include license configuration parameters including a number of modules that should be executed in parallel. The license configuration parameters may also include a number of process threads required that may be provided in the configuration file for the particular software product or service.

In an embodiment, the computer-implemented method may also be configured for generating a report corresponding to the one or more executables comprising one or more offers describing features and values corresponding to the user request data and the product data, analyzing the one or more groups of users based on the one or more user requirements and user characteristics, identifying a first group of users having a common user requirement or user characteristic and compiling the one or more executables for the first group of users based on the common user requirements or user characteristic.

Embodiments of the present invention recognize that a custom solution is desired to pre-package and preconfigure software products and services in an efficient and convenient manner. Implementation of embodiments of the invention may take a variety of forms, and exemplary implementation details are discussed subsequently with reference to the Figures.

Figure 1:
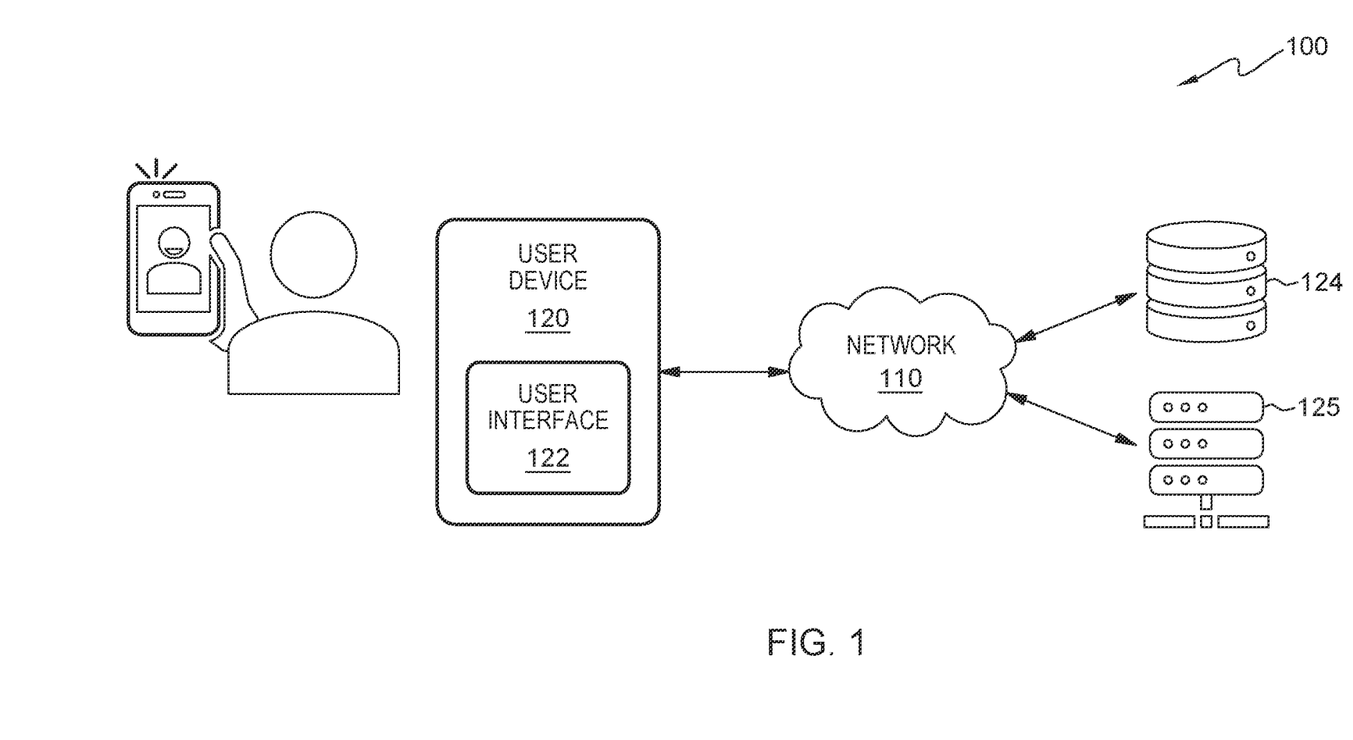
FIG. 1 depicts a block diagram of a distributed data processing environment for pre-packaging and pre-configuring software products and/or services, in accordance with an embodiment of the present invention.

FIG. 1 depicts a block diagram of a distributed data processing environment for pre-packaging and pre-configuring software products, in accordance with an embodiment of the present invention. FIG. 1 provides only an illustration of one embodiment of the present invention and does not imply any limitations with regard to the environments in which different embodiments may be implemented. In the depicted embodiment, distributed data processing environment 100 includes user device 120, server 125, and database 124, interconnected over network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between user device 120, server 125, and database 124. Distributed data processing environment 100 may also include additional servers, computers, or other devices not shown.

The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

User device 120 may operate to execute at least a part of a computer program for pre-packaging and pre-configuring software products. In an embodiment, user device 120 may be configured to send and/or receive data from one or more of database 124 and server 125 via network 110. User device 120 may include user interface 122 configured to facilitate interaction between a user ("client") and user device ("client device") 120. For example, user interface 122 may include a display as a mechanism to display data to a user and may be, for example, a touch screen, light emitting diode (LED) screen, or a liquid crystal display (LCD) screen. User interface 122 may also include a keypad or text entry device configured to receive alphanumeric entries from a user. User interface 122 may also include other peripheral components to further facilitate user interaction or data entry by user associated with user device 120.

In some embodiments, user device 120 may be a management server, a web server, or any other electronic device or computing system capable of receiving and sending data. In some embodiments, user device 120 may be a laptop computer, tablet computer, netbook computer, personal computer (PC), a desktop computer, a smart phone, or any programmable electronic device capable of communicating with database 124, server 125 via network 110. User device 120 may include components as described in further detail in FIG. 5.

Database 124 operates as a repository for data flowing to and from network 110. Examples of data include data corresponding to communications entered and received via user interface 122. A database is an organized collection of data. Database 124 can be implemented with any type of storage device capable of storing data and configuration files that can be accessed and utilized by user device 120, such as a database server, a hard disk drive, or a flash memory. In an embodiment, database 124 is accessed by user device 120 to store data corresponding to pre-packaging and pre-configuring software products. In another embodiment, database 124 may reside elsewhere within distributed network environment 100 provided database 124 has access to network 110.

Server 125 can be a standalone computing device, a management server, a web server, or any other electronic device or computing system capable of receiving, sending, and processing data and capable of communicating with user device 120 and/or database 124 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within distributed data processing environment 100. Server 125 may include components as described in further detail in FIG. 5.

Figure 2:
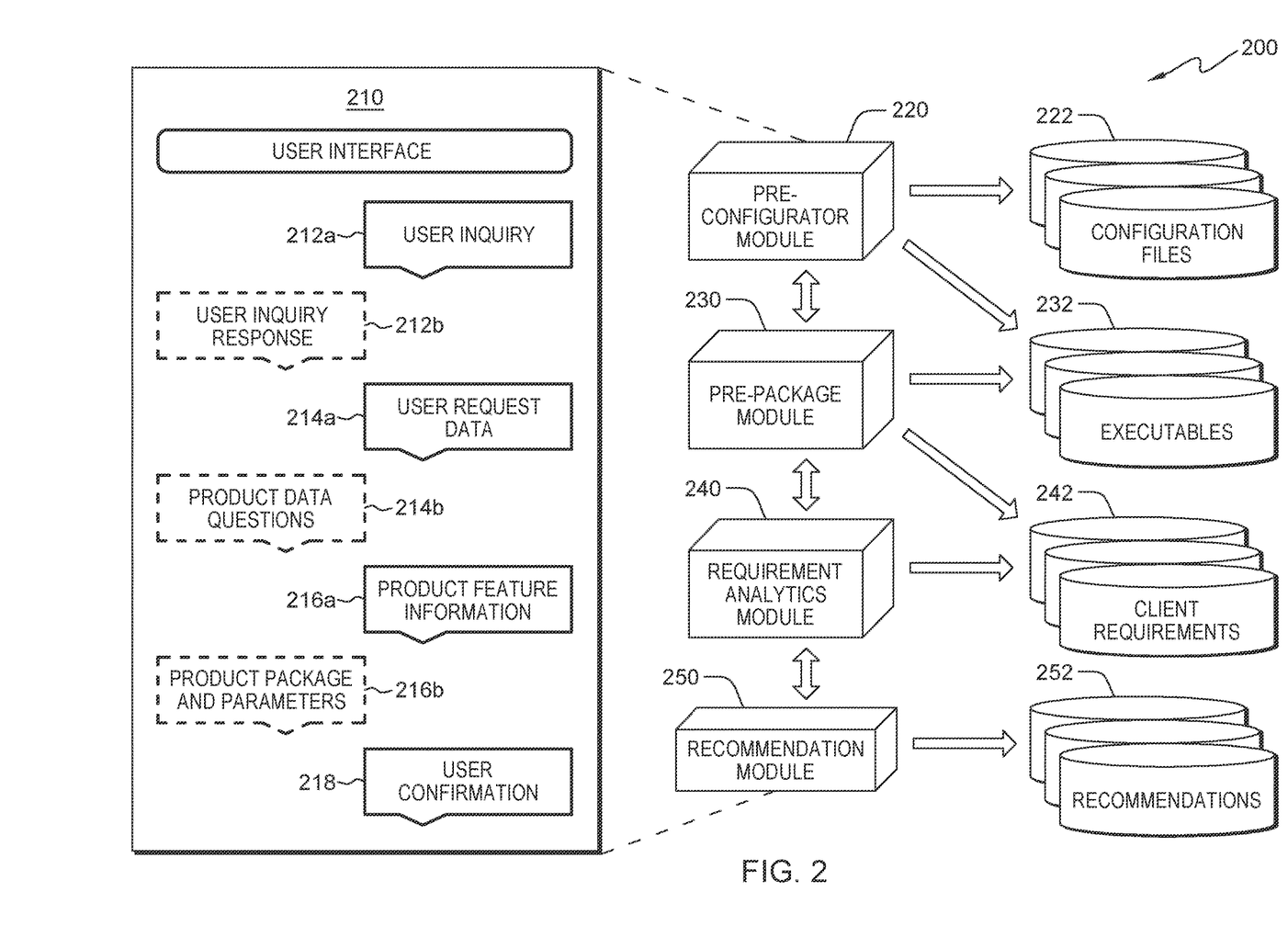
FIG. 2 depicts a more detailed block diagram of components of the distributed data processing environment of FIG. 1, in accordance with an embodiment of the present invention.

FIG. 2 depicts a more detailed block diagram of components of the distributed data processing environment of FIG. 1, in accordance with an embodiment of the present invention. In an embodiment, one or more processors may be configured to generate user interface 210 configured to generate a messaging dialog to facilitate communications between a user and a chatbot.

Computer-implemented method 200 may include one or more processors configured for enabling software or service pre-packaging and pre-configuration by a primary chatbot and a secondary chatbot. The primary chatbot is a high-level component in the dialog messaging system with a knowledgebase consistent with general product information sufficient to align requested client software features to software products or services based on the software product or service capabilities. The primary chatbot may be configured to pose questions to a client to elicit more information about the client's needs to identify the appropriate software product or service to satisfy the client's needs. The primary chatbot may also be configured to engage or initiate multiple secondary chatbots depending on the query received in the messaging dialog executing and shown within the user interface.

The secondary chatbot is a deep-level chatbot component in the chat messaging system with a knowledgebase consistent with a particular software product or service identified by the primary chatbot. The secondary chatbot may be configured to pose specific questions to a client to elicit information from the client to determine specific parameters and other features of the software product or service to satisfy the client's needs. Each secondary chatbot is provisioned with all the details associated with their particular software product or service. The secondary chatbot is invoked by the primary chatbot once the primary chatbot has identified the particular software product or service that the secondary chatbot specializes in. Multiple secondary chatbots may be configured to work in tandem under the control of the primary chatbot to process complex requirements.

Computer-implemented method 200 may be configured to use a Natural Language Processing (NLP) engine (not shown) to interpret user statements entered into the messaging dialog executing within user interface 210. An NLP engine is a core component that interprets user statements at any given time and converts the user statement to structured inputs that the system can process. NLP engines may contain advanced machine learning algorithms to identify user's intent and further matches user intent to a list of available actions supported by the chatbots residing within the system. For example, NLP engines may use either finite state automatic models or deep learning models to generate system-generated responses to user statements. NLP engine may include an intent classifier and an entity extractor, wherein the intent classifier may be configured to interpret the natural language of a user statement and the entity extractor may be configured to extract key information or keywords from the user statement.

A messaging dialog may be generated in user interface 210 configured to receive user inquiry 212a. Responsive to receiving user inquiry 212a, the one or more processors may be configured to initiate a first chat session comprising a primary chatbot within user interface 210. Primary chatbot may be configured to provide user inquiry response 212b as a system-generated response to user inquiry 212a. The one or more processors may be configured to interpret user inquiry 212a to determine what the user is seeking, and in response to determining what the user is seeking, provide user inquiry response 212b. User inquiry response 212b may be a string of characters or an audio response in the form of a question for the user to answer, a statement of relevant results, or some other relevant response.

In an embodiment, the one or more processors may include NLP engine configured to interpret user inquiry 212a or any other user entry into the messaging dialog executing in user interface 210 by processing the string of communications and generating structured text containing keywords to be extracted and further processed.

Computer-implemented method 200 may include one or more processors configured to receive user request data 214a corresponding to a string of communications entered in user interface 210 in response to system-generated user inquiry response 212b. User request data 214a may be received in response to primary chatbot eliciting software products needs information from the user. For example, user inquiry 212a may include a string of communications including "I want to purchase cloud storage for my business", followed by a system generated user inquiry response 212b by the primary chatbot that may include a string of communications including "Thank you for your request. What type of cloud storage would you like?" The one or more processors may then be configured to receive user request data 214a corresponding to details about the software product or service the user is requesting in the messaging dialog. Each software product may be associated with a secondary chatbot ("product-level chatbot") configured to elicit more specific information about the software product or service the user would like to have as part of the final solution.

For example, user request data 214a may include a string of communications including, "I want to store electronic data and records but do not need lots of storage capacity." The one or more processors may be configured to interpret keywords "store data and records" and "do not need lots of capacity" and align those keywords to products features corresponding to specific software products or services. For example, a software product may include the following features "Scalable. Durable, Secure. Cost effective. An application-data archive and backup platform offers persistent cloud storage and data encryption by default. Made for records retention, it helps with regulatory compliance. 25 GB per month—no cost." In this example, the user provided keywords may be determined to be in alignment with the following software product feature information 216a (e.g., "cost effective," application-data archive," "persistent cloud storage," and "25 GB per month—no cost") corresponding to a Cloud Object Storage software product. Therefore, the one or more processors may be configured to initiate a secondary chatbot designated to specialize in the Cloud Object Storage software product to engage in the ongoing messaging dialog with the user in user interface 210.

Alternatively, the primary chatbot may be configured to ask further questions to narrow down the user inquiry to a certain number of results corresponding to software product offerings available. For example, the primary chatbot may be configured to interpret product feature information 216a including one or more of the keywords "purchase cloud storage" as cloud storage software products or services for a business and provide a system generated user inquiry response 212b including a string of communications including "Cloud Object Storage, Cloud Block Storage, or Cloud File Storage?"

In an embodiment, computer-implemented method 200 may be configured to present product data questions 214b to the user in the messaging dialog executing in user interface 210, wherein the product data questions 214b may be presented by a secondary chatbot with specific deep-level knowledge about the identified software product determined based on the keywords entered by the user as user request data 214a in the messaging dialog. Responsive to receiving product data questions 214b, the one or more processors may be configured to receive and interpret product feature information 216b corresponding to specific features of the software product or service entered by the client.

The computer-implemented method 200 may be configured to use a pre-configurator module 220 to create configuration files 222 at least by extracting keywords (e.g., user request data 214a, product feature information 216a) from client messages entered in the user interface and aligning the extracted keywords with product features (e.g., product package and parameters 216b), descriptions, documents, offering codes, etc. Further, pre-configurator module 220 may be configured to use the primary chatbot to pose questions (e.g., product data questions 214b) in the messaging dialog in the user interface to elicit responses (e.g., product feature information 216a) from a client engaged in the messaging dialog to determine parameter values (e.g., product package and parameters 216b) used to configure the determined software product, especially if those parameter values are not already determined to be entered in the messaging dialog provided in the user interface. Further, pre-configurator module 220 may be configured to determine compiler flags based on keywords entered in the messaging dialog and further to inject the compiler flags into one or more executables 232 to be included as part of the software product. In an embodiment, the one or more processors may be configured to receive user confirmation 218 from a client engaged in the messaging dialog in response to providing product package and parameters 216b. For example, if the client specifies product feature information 216a, and the secondary chatbot provides product package and parameters 216b corresponding to the product the client requested, then a user confirmation 218 may be received to confirm that the client is satisfied with the product package and parameters 216b.

In an embodiment, computer-implemented method 200 may include pre-package module 230 configured to pre-package software packages and build and/or compile executables 232 with certain flags and parameters (e.g., product package parameters 216b) determined based on keywords (e.g., user request data 214a, product feature information 216a) entered in and extracted from the messaging dialog. Pre-package module 230 may also generate reports for use by downstream sales personnel to prepare the sales personnel with relevant information to include in an offer or proposal including certain values and features applicable to the client's stated needs.

The reports may be prepared in a specific format that can be provided to a service deployment or service orchestrator for downstream orchestration in a hybrid Multicloud environment. For example, in a hybrid Multicloud environment, service orchestration may determine parameters specific to a service offering, its dependencies, duration of service required, cost effectiveness, service availability with quality of service ("QOS") parameters, etc. The service orchestration parameters may be intelligently gathered using chatbots by eliciting user responses in a message dialog executing in a user interface, wherein the responses may be used to determine the parameters.

Pre-package module 230 may be configured to group different client requirements 242 into buckets, compile the respective executables 232 once per bucket, and share with all clients in that bucket. The buckets may be specific to industries, countries, or compliance requirements, etc. For example, for a plurality of clients, a first set of clients may have a first need type, a second set of clients may have a second need type and a third set of clients may have a third need type. If the executables 232 are to be compiled on the once per bucket basis, then there are three buckets including the same need types for the clients belonging to that bucket to be compiled. An additional bucket for generic clients with a default need type may be compiled, resulting in four total compilations using the once per bucket basis. Clients may be ranked according to their value to the business, wherein higher-ranking clients may be prioritized over lower ranking clients. Further, generic clients may have default values assigned to the parameters used to determine a ranking, wherein the default values may be replaced with custom values as per their needs within their business.

In an embodiment, computer-implemented method 200 may include requirement analytics module 240 configured to analyze client requirements 242 and place them into different sets of requirements or buckets for later processing or compiling. Requirement analytics module 240 may also be configured to compile the client requirements 242 on a once per bucket basis using data generated from the pre-package module and respective compilers. The sets of requirements or buckets may be organized by industry, country, or compliance requirements.

In an embodiment, computer-implemented method 200 may include recommendation module 250 configured to provide recommendations 252 to recommend software components specific from to specific industries, or countries, etc. Recommendation module 250 may also be configured to provide recommendations 252 to recommend software components based on specific software categories and based on a purchase history associated with a particular client at least by matching software categories with the client specific feedback about their experience with a corresponding software tool.

Figure 3:
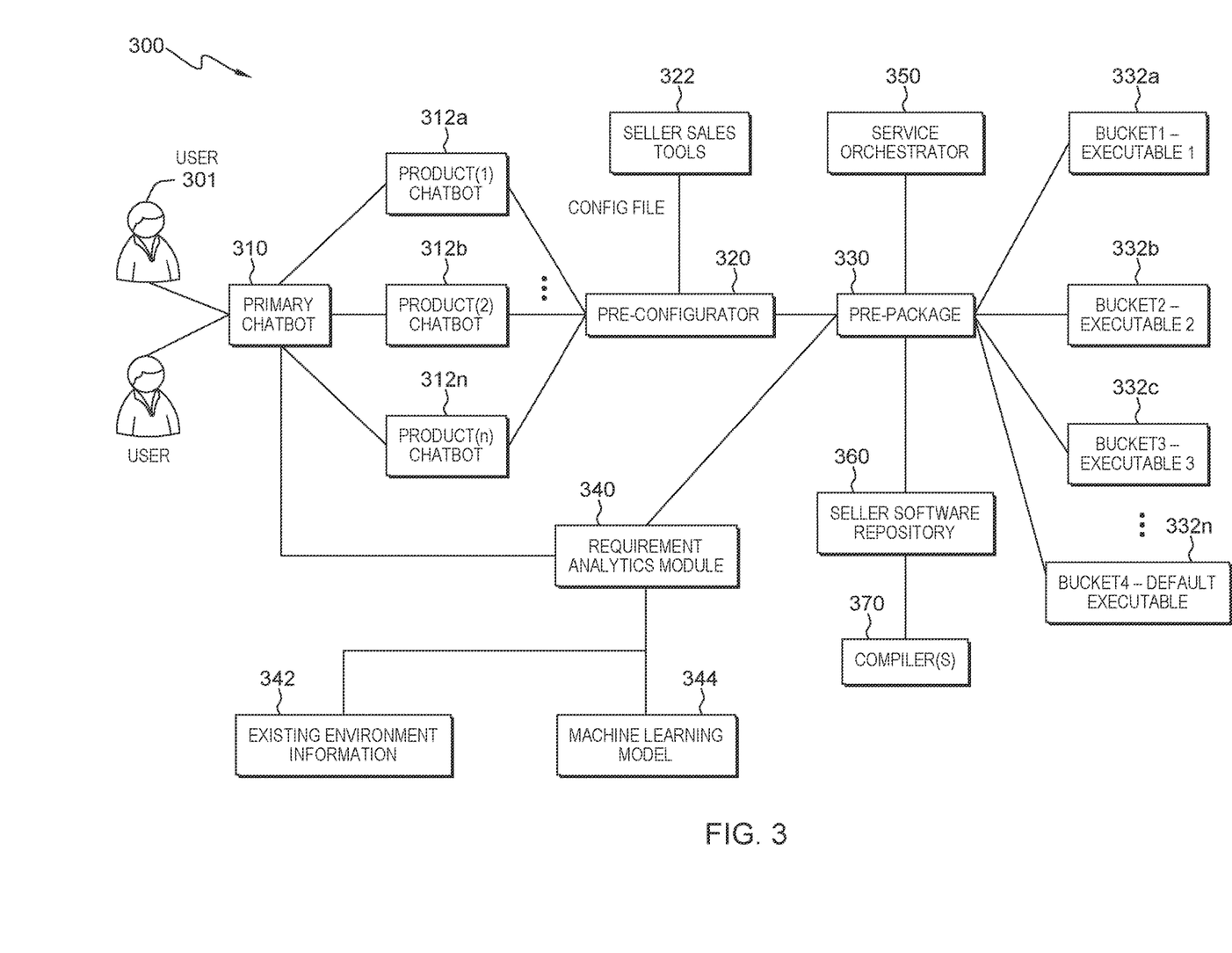
FIG. 3 depicts a block diagram of components of a system for pre-packaging and pre-configuring software products, in accordance with an embodiment of the present invention.

FIG. 3 depicts a block diagram of components of system 300 for pre-packaging and pre-configuring software products, in accordance with an embodiment of the present invention.

In an embodiment, system 300 for pre-packaging and pre-configuring software products using chatbots may include primary chatbot 310 configured to consolidate data received within the messaging dialog executing within a user interface. Primary chatbot 310 may also be configured to align requested client software features to software products or services based on the software product or service capabilities. Primary chatbot 310 may be configured to pose questions client 301 (e.g., user) to elicit more information about the client's needs to identify the appropriate software product or service to satisfy the client's needs. Primary chatbot 310 may also be configured to engage or initiate multiple secondary ("product-level") chatbots 312a, 312b, . . . 312n depending on the query received in the messaging dialog executing and shown within the user interface.

For example, if a user entry includes a request for a storage service, then primary chatbot 310 may be configured to initiate product-level chatbot 312a specific to storage products or services, wherein product-level chatbot 312a may request specific storage requirements for the user request. Product-level chatbot 312a may request specific storage requirement by presenting specific questions tailored to receive information in the messaging dialog executing in the user interface. In response, the user may provide the requested information by indicating a storage quantity, a storage term, a storage type, or some other feature associated with software storage products or services.

In an embodiment, system 300 for pre-packaging and pre-configuring software products using chatbots may include pre-configurator module 320 to create configuration files at least by extracting keywords from client messages entered in the user interface and aligning the extracted keywords with product features, descriptions, documents, offering codes, etc. Further, pre-configurator module 320 may be configured to pose questions in the messaging dialog in the user interface to elicit responses from a client engaged in the messaging dialog to determine parameter values used to configure the determined software product, especially if those parameter values are not already determined to be entered in the messaging dialog provided in the user interface. Further, pre-configurator module 320 may be configured to determine compiler flags based on keywords entered in the messaging dialog and further to inject the compiler flags into one or more executables 332 via pre-package module 330 to be included as part of the software product.

In an embodiment, system 300 may include pre-package module 330 configured to pre-package software packages and build and/or compile executables 332a, 332b, 332c, . . . 332n with certain flags and parameters determined based on keywords entered in and extracted from the messaging dialog. Pre-package module 330 may also generate reports for use by downstream sales personnel to prepare the sales personnel with relevant information to include in an offer or proposal including certain values and features applicable to the client's stated needs. Pre-package module 330 may use seller sales tools 322 received from pre-configurator module 320 to generate reports for use by downstream sales personnel.

In an embodiment, seller sales tools 322 may include software applications configured for providing sales information corresponding to trending topics, relevant content, user interests, and other information representing sales data for a particular software product or service for a particular user or class of users. Seller sales tools 322 may also include software applications configured to generate sales reports based on a particular set of parameters determined by the user or based on predetermined settings.

The reports may be prepared in a specific format that can be provided to a service deployment or service orchestrator 350 for downstream orchestration in a hybrid Multicloud environment. For example, in a hybrid Multicloud environment, service orchestrator 350 may be configured to determine parameters specific to a service offering, its dependencies, duration of service required, cost effectiveness, service availability with quality of service ("QOS") parameters, etc. The service orchestration parameters may be intelligently gathered using chatbots by eliciting user responses in a message dialog executing in a user interface, wherein the responses may be used to determine the parameters.

In an embodiment, system 300 may include pre-package module 330 configured to group different client requirements into buckets, and compile the respective executables 332 once per bucket, and share with all clients in that bucket. The respective executables 332 may be compiled using compiler(s) 370 and facilitate the compilation via pre-package module 330. The buckets may be specific to industries, countries, or compliance requirements, etc. For example, for a plurality of clients, a first set of clients may have a first need type, a second set of clients may have a second need type and a third set of clients may have a third need type. If the executables 232 are to be compiled on the once per bucket basis, then there are three executables (e.g., buckets) 332a, 332b, 332c including the same need types for the clients belonging to that bucket to be compiled. An additional bucket 332n for generic clients with a default need type may be compiled, resulting in four total compilations using the once per bucket basis. Clients may be ranked according to their value to the business, wherein higher-ranking clients may be prioritized over lower ranking clients. Further, generic clients may have default values assigned to the parameters used to determine a ranking, wherein the default values may be replaced with custom values as per their needs within their business.

In an embodiment, system 300 may include requirement analytics module 340 configured to analyze client requirements and place them into different sets of requirements or buckets and sent to pre-package module 330 for later processing or compiling. Requirement analytics module 340 may also be configured to compile, using compiler 370, the client requirements on a once per bucket basis using data generated from pre-package module 330 and respective compiler(s) 370. The sets of requirements or buckets may be organized by industry, country, or compliance requirements.

In an embodiment, system 300 for pre-packaging and pre-configuring software products using chatbots may include providing data corresponding to existing environment information 342 to requirement analytics module 340. Existing environment information may include instructions for discovery, configuration import settings, and current install settings. For example, existing environment information 342 may include current licensing information for existing products and/or services, configuration information, number of servers, type of operating system, server hardware architecture information, middleware, web server, software modules implemented within the environment, network information, etc.

Further, in an embodiment, system 300 for pre-packaging and pre-configuring software products using chatbots may include machine learning model 344 that outputs machine learning data representing a plurality of instances associated with client requirements gathered from the messaging dialog. For example, system 300 may include machine learning model 344 configured to receive data corresponding to historical software products or services sales, sales requests, or feedback from users, process the data, and generate output data representing features of the received data. In an embodiment, the output data may represent a correlation between the historical data and data gathered from current users with similar cases or similar parameters to provide recommendations or insights about what the current users may prefer in their software products or services. For example, if historical users preferred or included a first set of parameters, and a first particular configuration and package of software products or services were determined to be a successful sale and implementation for the historical users, then the machine learning model 344 may be configured to process that historical data and generate output data representing a likelihood that a second particular configuration and package of software products or services will be successful as a recommendation to a sales agent for presentation to the current users.

In an embodiment, system 300 for pre-packaging and pre-configuring software products using chatbots may include seller software repository 360 including a library of seller software products or services available for sale. For example, seller software repository 360 may be integrated or connected to a library containing seller software or hardware products and/or services that may be sold or offered for sale. Seller software repository 360 may include source code, binary instructions, or software modules that may be customized and/or compiled as per the requirements.

In an embodiment, system 300 for pre-packaging and pre-configuring software products using chatbots may include compiler(s) 370. Compiler(s) 370 may include a computer program configured to translate computer code written in a first programming language into a second programming language. Compiler 370 may be configured to perform preprocessing, lexical analysis, parsing, semantic analysis, conversion of input programs to an intermediate representation, code optimization, and code generation. For example, compiler 370 may perform compiling processes based on various flags, parameters gathered, and analyses performed during previous operations. Further, compiler 370 may perform compiling processes based on environment details discovered during the previous operations, framework, and run time for each software product and/or service, as known to those of skill in the art.

Figure 4:
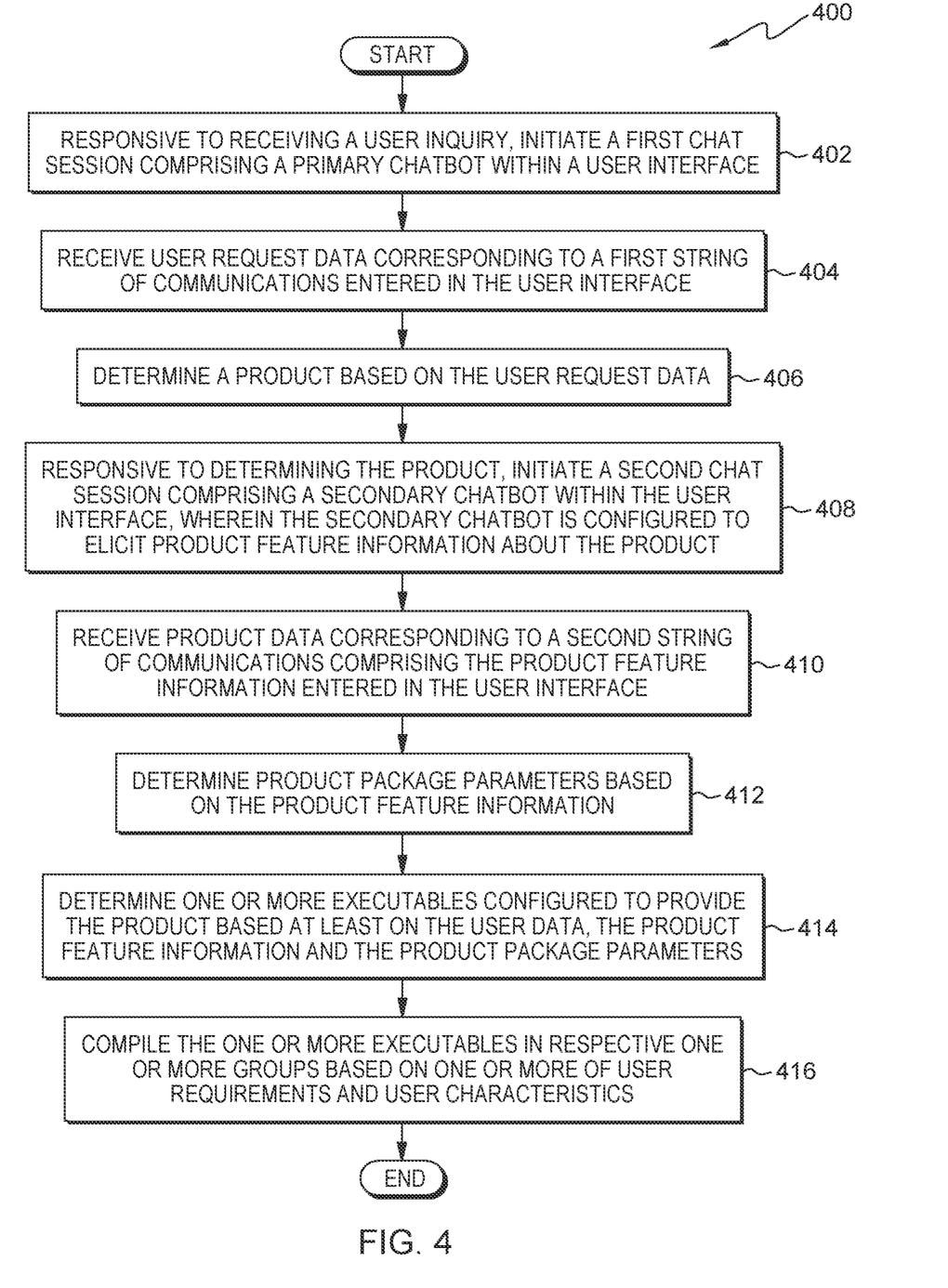
FIG. 4 illustrates operational steps of a pre-packaging and pre-configuring software products computer-implemented method, in accordance with an embodiment of the present invention.

FIG. 4 illustrates operational steps of computer-implemented method 400, on a user device within the distributed data processing environment of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computer-implemented method 400 for pre-packaging and pre-configuring software products may include one or more processors configured for receiving a user inquiry and response to receiving the user inquiry, initiating 402 a first chat session comprising a primary chatbot within a user interface.

Computer-implemented method 400 may also be configured for receiving 404 user request data corresponding to a first string of communications entered in the user interface and determining 406 a product based on the user request data.

Responsive to determining the product, computer-implemented method 400 may also be configured for initiating 408 a second chat session comprising a secondary chatbot within the user interface, wherein the secondary chatbot is configured to elicit product feature information about the product. In an embodiment, initiating the chat session may include generating a messaging dialog user interface configured to receive a user input and provide a system-generated response to the user input. The second chat session may appear virtually as the same chat session as the first chat session, wherein the user will not be aware that a second chat session is now operating within the user interface.

Computer-implemented method 400 may also be configured for receiving 410 product data corresponding to a second string of communications comprising the product feature information entered in the user interface. Computer-implemented method 400 may also be configured for determining 412 product package parameters based on the product information. Computer-implemented method 400 may also be configured for determining 414 one or more executables configured to provide the product based at least on the user request data, the product feature information and the product package parameters. Further, computer-implemented method 400 may be configured for compiling 416 the one or more executables for each of the one or more groups of users based on one of the one or more user requirements and user characteristics.

Computer-implemented method 400 may also be configured for compiling the one or more executables in respective one or more groups based on one or more of user requirements and user characteristics. In an embodiment, compiling the one or more executables may further include determining flags and parameters based on the product data and including the flags and parameters in the one or more executables. In an embodiment, computer-implemented method 400 may also be configured for generating a report corresponding to the one or more executables comprising one or more offers describing features and values corresponding to the user request data and the product data.

In an embodiment, computer-implemented method 400 may also be configured for recommending components specific to a first category of users based on respective user histories and respective user feedback.

In an embodiment, computer-implemented method 400 may also be configured for analyzing the one or more groups of users based on the one or more user requirements and user characteristics, identifying a first group of users having a common user requirement or user characteristic and compiling the one or more executables for the first group of users based on the common user requirements or user characteristic.

Figure 5:
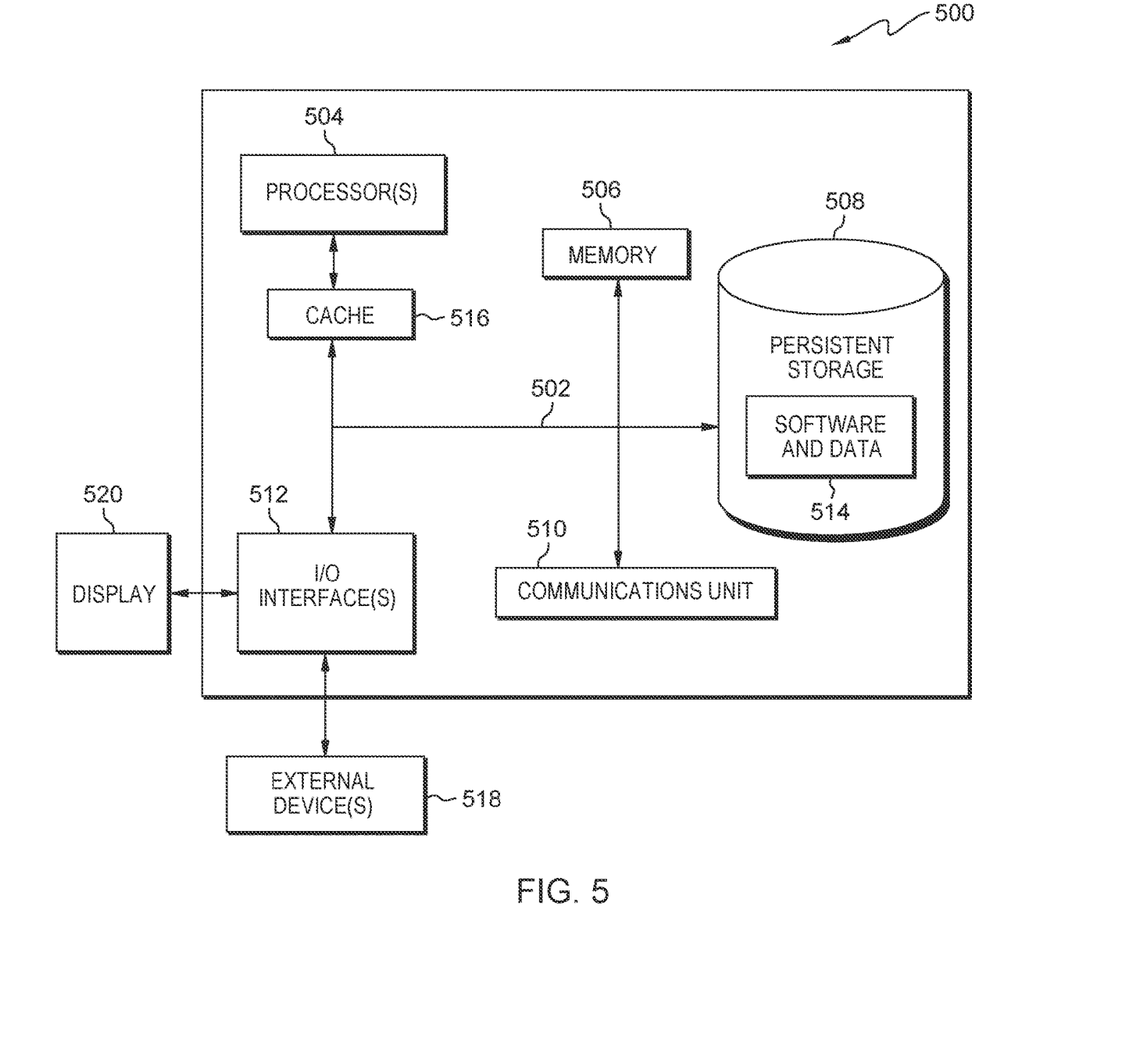
FIG. 5 depicts a block diagram of components of a server computer within the distributed data processing environment of FIG. 1, in accordance with an embodiment of the present invention.

FIG. 5 depicts a block diagram of components of the server computer executing the software products pre-packaging and pre-configuring program within the distributed data processing environment of FIG. 1, in accordance with an embodiment of the present invention.

Computing device 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Programs may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs, as described herein, may be downloaded to persistent storage 508 through communications unit 510.

I/O interface(s) 512 allows for input and output of data with other devices that may be connected to user device 120. For example, I/O interface 512 may provide a connection to external devices 518 such as image sensor, a keyboard, a keypad, a touch screen, and/or some other suitable input device. External devices 518 can also include portable computer readable storage media such as, for example, thumb drives, portable optical or magnetic disks, and memory cards. Software and data 514 used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

Software and data 514 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The invention claimed is:

1. A computer-implemented method for pre-packaging and pre-configuring software products, comprising:
   responsive to receiving a user inquiry, initiating, by one or more processors, a first chat session comprising a primary chatbot within a user interface;
   receiving, by the one or more processors, user request data corresponding to a first string of communications entered in the user interface;
   determining, by the one or more processors, a product based on the user request data;
   responsive to determining the product, initiating, by the one or more processors, a second chat session comprising a secondary chatbot within the user interface, wherein the secondary chatbot is configured to elicit product feature information about the product;
   receiving, by the one or more processors, product data corresponding to a second string of communications comprising the product feature information entered in the user interface;
   determining, by the one or more processors, product package parameters based on the product feature information;
   determining, by the one or more processors, one or more executables configured to provide the product based at least on the user request data, the product feature information, and the product package parameters; and
   compiling, by the one or more processors, the one or more executables in respective one or more groups based on one or more of user requirements and user characteristics.

2. The computer-implemented method of claim 1, wherein initiating the first chat session comprises generating a messaging dialog user interface configured to receive a user input and provide a system-generated response to the user input.

3. The computer-implemented method of claim 1, wherein the second chat session appears virtually similar to the first chat session.

4. The computer-implemented method of claim 1, further comprising:

recommending, by the one or more processors, components specific to a first category of users based on respective user histories and respective user feedback.

5. The computer-implemented method of claim 1, wherein compiling the one or more executables further comprises:
  determining, by the one or more processors, flags and parameters based on the product data; and
  including, by the one or more processors, the flags and parameters in the one or more executables.

6. The computer-implemented method of claim 5, further comprising:
  generating, by the one or more processors, a report corresponding to the one or more executables comprising one or more offers describing features and values corresponding to the user request data and the product data.

7. The computer-implemented method of claim 1, further comprising:
  analyzing, by the one or more processors, one or more groups of users based on the one or more user requirements and user characteristics;
  identifying, by the one or more processors, a first group of users having a common user requirement or user characteristic; and
  compiling, by the one or more processors, the one or more executables for the first group of users based on the common user requirements or user characteristic.

8. A computer program product for pre-packaging and pre-configuring software products, the computer program product comprising:
  one or more computer readable storage media and program instructions stored on the one or more computer readable storage media, the program instructions comprising:
    responsive to receiving a user inquiry, program instructions to initiate a first chat session comprising a primary chatbot within a user interface;
    program instructions to receive user request data corresponding to a first string of communications entered in the user interface;
    program instructions to determine a product based on the user request data;
    responsive to determining the product, program instructions to initiate a second chat session comprising a secondary chatbot within the user interface, wherein the secondary chatbot is configured to elicit product feature information about the product;
    program instructions to receive product data corresponding to a second string of communications comprising the product feature information entered in the user interface;
    program instructions to determine product package parameters based on the product feature information;
    program instructions to determine one or more executables configured to provide the product based at least on the user request data, the product feature information and the product package parameters; and
    program instructions to compile the one or more executables in respective one or more groups based on one or more of user requirements and user characteristics.

9. The computer program product of claim 8, wherein initiating the first chat session comprises program instructions to generate a messaging dialog user interface configured to receive a user input and provide a system-generated response to the user input.

10. The computer program product of claim 8, wherein the second chat session appears virtually similar to the first chat session.

11. The computer program product of claim 8, further comprising:
  program instructions to recommend components specific to a first category of users based on respective user histories and respective user feedback.

12. The computer program product of claim 8, wherein compiling the one or more executables further comprises:
  program instructions to determine flags and parameters based on the product data; and
  program instructions to include the flags and parameters in the one or more executables.

13. The computer program product of claim 12, further comprising:
  program instructions to generate a report corresponding to the one or more executables comprising one or more offers describing features and values corresponding to the user request data and the product data.

14. The computer program product of claim 8, further comprising:
  program instructions to analyze one or more groups of users based on the one or more user requirements and user characteristics;
  program instructions to identify a first group of users having a common user requirement or user characteristic; and
  program instructions to compile the one or more executables for the first group of users based on the common user requirements or user characteristic.

15. A computer system for pre-configuring and pre-packaging software products, the computer system comprising:
  one or more computer processors;
  one or more computer readable storage media;
  program instructions stored on the one or more computer readable storage media for execution by at least one of the one or more processors, the program instructions comprising:
    responsive to receiving a user inquiry, program instructions to initiate a first chat session comprising a primary chatbot within a user interface;
    program instructions to receive user request data corresponding to a first string of communications entered in the user interface;
    program instructions to determine a product based on the user request data;
    responsive to determining the product, program instructions to initiate a second chat session comprising a secondary chatbot within the user interface, wherein the secondary chatbot is configured to elicit product feature information about the product;
    program instructions to receive product data corresponding to a second string of communications comprising the product feature information entered in the user interface;
    program instructions to determine product package parameters based on the product feature information;
    program instructions to determine one or more executables configured to provide the product based at least on the user request data, the product feature information and the product package parameters; and program instructions to compile the one or more executables in respective one or more groups based on one or more of user requirements and user characteristics.

16. The computer system of claim 15, wherein initiating the first chat session comprises program instructions to generate a messaging dialog user interface configured to receive a user input and provide a system-generated response to the user input, wherein the second chat session appears virtually similar to the first chat session.

17. The computer system of claim 15, further comprising:
program instructions to recommend components specific to a first category of users based on respective user histories and respective user feedback.

18. The computer system of claim 15, wherein compiling the one or more executables further comprises:
program instructions to determine flags and parameters based on the product data; and
program instructions to include the flags and parameters in the one or more executables.

19. The computer system of claim 18, further comprising:
program instructions to generate a report corresponding to the one or more executables comprising one or more offers describing features and values corresponding to the user request data and the product data.

20. The computer system of claim 15, further comprising:
program instructions to analyze one or more groups of users based on the one or more user requirements and user characteristics; and
program instructions to identify a first group of users having a common user requirement or user characteristic; and
program instructions to compile the one or more executables for the first group of users based on the common user requirements or user characteristic.

* * * * *